United States Patent Office 3,481,708
Patented Dec. 2, 1969

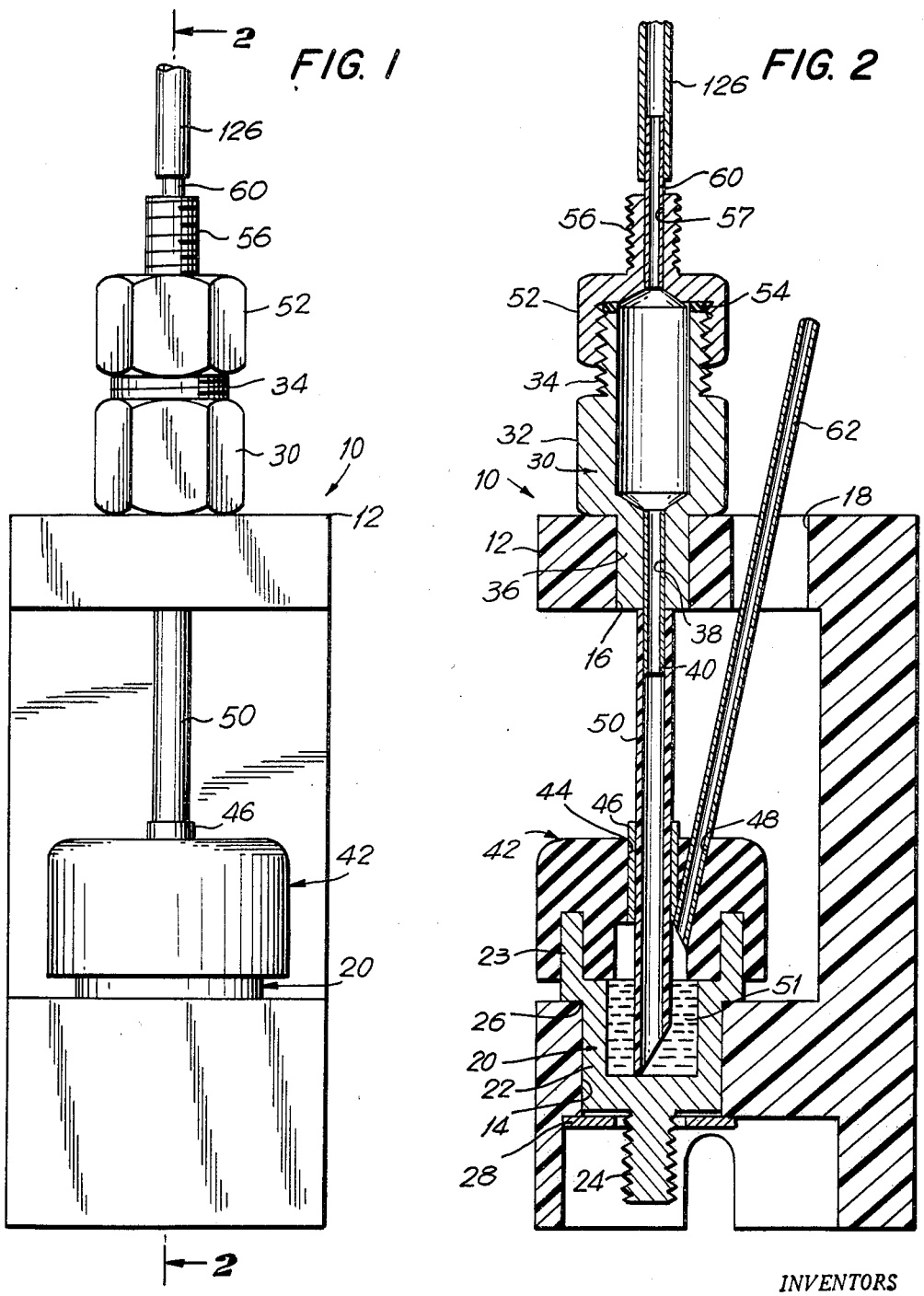

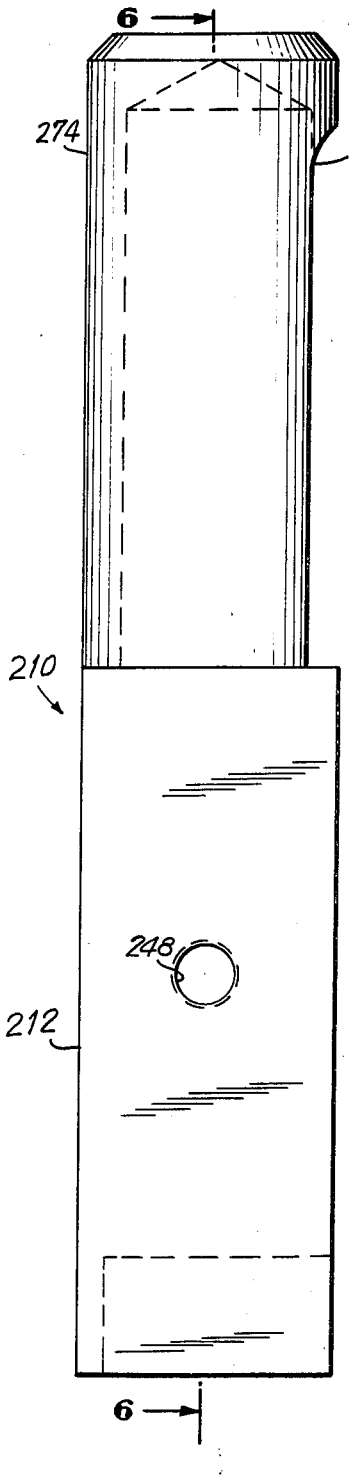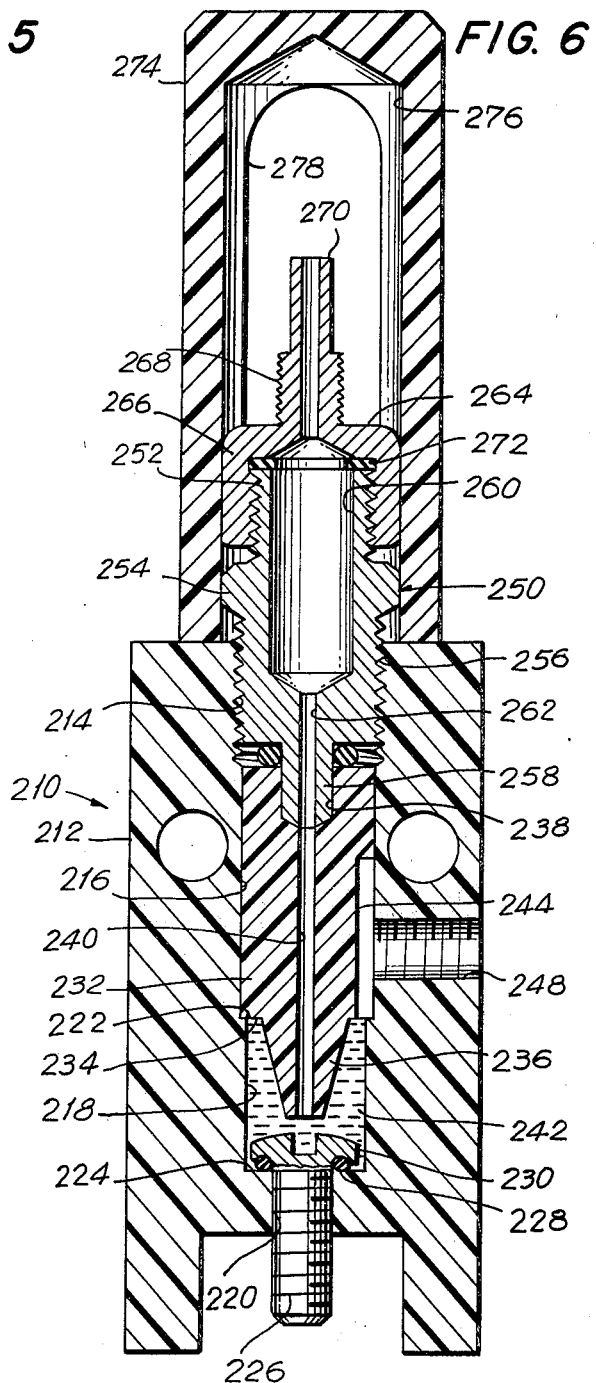

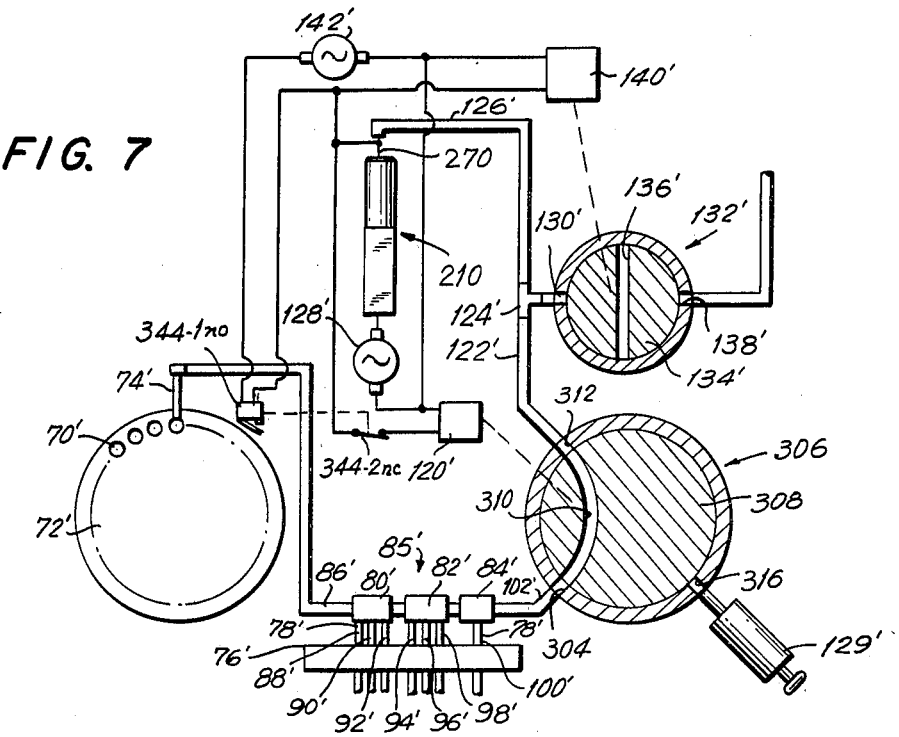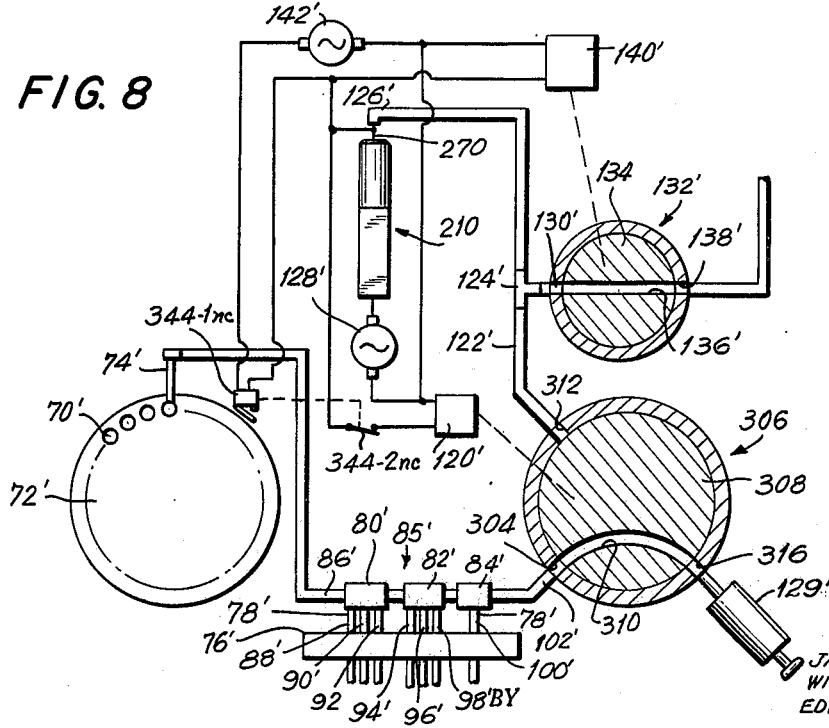

3,481,708
AUTOMATIC ANALYSIS APPARATUS
CONTROL MEANS
Jack Isreeli, Mamaroneck, William J. Smythe, Rye, and Edward W. Larrabee, Bronxville, N.Y., assignors to Technicon Corporation, a corporation of New York
Filed Aug. 19, 1966, Ser. No. 573,581
Int. Cl. G01n 31/00
U.S. Cl. 23—253    6 Claims

ABSTRACT OF THE DISCLOSURE

An automatic analysis apparatus includes a sample off-take for directing a stream of successive samples along a sample stream dividing conduit which, in turn, is coupled to a plurality of peristaltic pump tubes. A manometer is coupled to detect and indicate a pressure drop along the conduit due to a stoppage in the off-take tube. Also, a source of wash liquid is coupled to the conduit for back-flushing the off-take tube. A valving arrangement connects the manometer to the conduit, and is responsive to the manometer upon a stoppage in the off-take tube to alternatively connect the wash liquid source to the conduit while venting the manometer. In addition, the valving arrangement automatically vents the conduit to compensate for changes in the ambient pressure after a selected number of samples forming a portion of the sample stream have been provided along the conduit.

---

This invention relates to the automatic continuous analysis of liquids, and, more particularly, to an apparatus for detecting clots or other failures in the device for supplying samples.

Apparatuses for the automatic, continuous anlaysis of liquids are well known. Such an apparatus is shown in U.S. Patent No. 2,797,149 issued to Leonard T. Skeggs on June 25, 1957. The analysis apparatus is fed sequential samples as a continuous stream by means of an off-take device which aspirates liquid from each of a plurality of sample containers, which are sequentially presented thereto by a sampler assembly, such as is shown in U.S. Patent No. 2,879,141 issued to Leonard T. Skeggs on Mar. 24, 1959. More recently, apparatuses have become known wherein the initial continuous stream of samples is divided into a plurality of quotient streams each containing a fractional portion of each sample from the initial stream. Each quotient stream is then analyzed, and the results are recorded in correlation automatically. Such apparatuses are discussed in "Multiple Automatic Sequential Analysis," Clinical Chemistry, vol. 10, No. 10, October 1964, pp. 918–936, by L. T. Skeggs and H. Hochstrasser; and "New Dimensions in Medical Diagnoses," Analytical Chemistry, vol. 38, No. 6, May 1966, pp. 31A–42A, by L. T. Skeggs.

Most often, the sample fluids which are being analyzed are of human origin, such as blood. Such fluids occasionally include clots of non-liquid material, which, if carried into the apparatus, might cause a stoppage of flow therein. Such a stoppage would only be visible immediately to the operator by continuous visual inspection of all parts of the apparatus; or would be visible ultimately by unreasonable results indicated by the recorder. In such an event, all of the samples between the time of stoppage within the system and its discovery and correction by the operator would be lost. Generally, such stoppages occur in the off-take tube itself. Customarily, the off-take tube has the smallest internal diameter of the system, e.g. a 22 gage syringe needle having an 0.015 inch internal diameter.

A device for immediately detecting and indicating stoppages in the off-take tube is disclosed in U.S. patent application Ser. No. 480,456, now U.S. Patent No. 3,424,557, filed Aug. 17, 1965 by Leonard T. Skeggs. The exemplary embodiment therein disclosed a glass manometer tube having mercury and two spaced apart contacts coupled by a normally open, manually operable, valve to the conduit which receives the sample from the off-take tube. If a stoppage occurs the pressure within the conduit would fall causing the mercury to shift and open circuit the two contacts, providing an alarm signal. A source of reverse flush liquid was also coupled to the conduit by a normally closed, manually operable valve. With the manometer valve closed and the reverse flush valve opened, reverse flushing of the conduit would normally expell the clot from the system. This embodiment, when operated carefully, is well suited to its purpose. However, the manometer, being a closed system, is sensitive to fluctuations in ambient temperature and pressure. Further, the use of a manually operable valve on the reverse flush device permits the inadvertent flushing of the conduit.

It is an object of this invention to provide an improved device for detecting, indicating and correcting stoppages, by providing a device which is insensitive to fluctuation in ambient temperature and pressure, which is highly sensitive, and which is relatively fool-proof in its reverse flush operation.

A feature of this invention is an automatic analysis apparatus for a plurality of sequential samples, having a manometer coupled to the sample supply conduit, wherein the manometer is automatically vented to the ambient atmosphere once for each sample, thereby compensating the manometer for any change in ambient temperature or pressure. Another feature is the provision of a valve means which normally couples the manometer to the conduit whose pressure is being measured, and which normally decouples the reverse flush means therefrom; and which valve means, on the development of a stoppage is operated to decouple the manometer and to couple the reverse flush means to the conduit which has developed a stoppage.

These and other objects, features and advantages of this invention will be apparent from the following specification taken in conjunction with the accompanying drawing in which:

FIG. 1 is a view in elevation of a first embodiment of a manometer of this invention;

FIG. 2 is a view in elevation of the device of FIG. 1 taken in section along the plane 2—2;

FIG. 5 is a view in elevation of a second embodiment of a manometer of this invention;

FIG. 6 is a view in elevation of the device of FIG. 5 taken in section along the plane 5—5;

FIG. 7 is a schematic diagram of a second embodiment of an analytic apparatus of this invention, showing the manometer-reverse flush valve in its normal position; and FIG. 8 is a schematic diagram of the apparatus of FIG. 7, showing the manometer-reverse flush valve and the vent valve in their stoppage positions.

Figure 3:
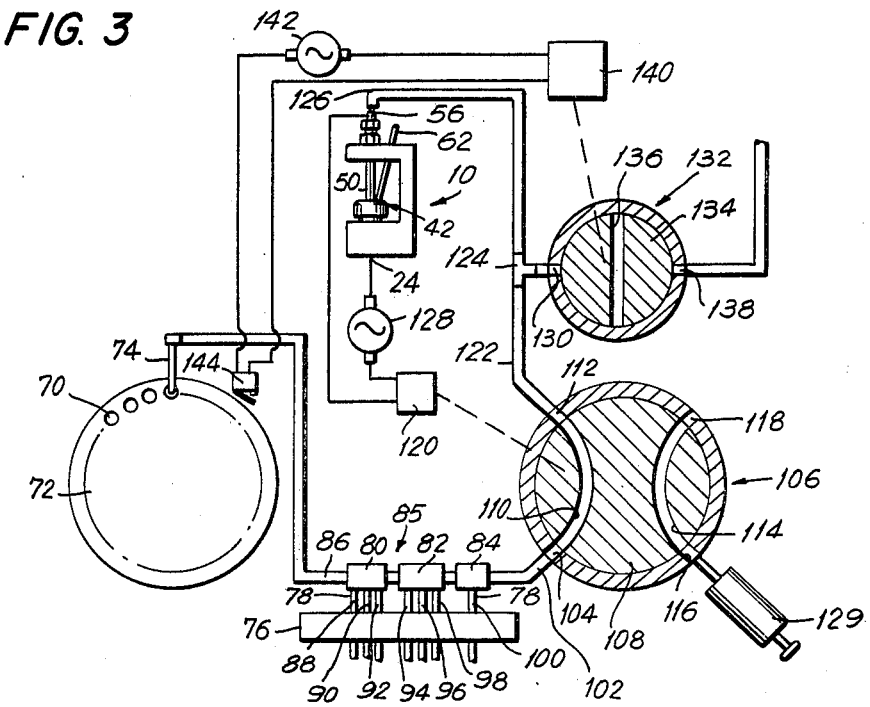
FIG. 3 is a schematic diagram of a first embodiment of an analytic apparatus of this invention, showing the manometer-reverse flush valve in its normal position.

As seen in FIGS. 1 and 2, the first embodiment of the manometer 10 comprises a frame 12 made of a dielectric, such as plastic, having a lower central bore 14, an upper central bore 16 and an upper rear bore 18. A lower metal cup 20, having a middle portion 22 serving as a well for mercury, an upper annular portion 23, and a lower portion 24 serving as an electric terminal, is disposed through the bore 14 and held in place by a shoulder 26 on the well portion 22 and a washer 28 and a nut, which is not shown, on the terminal portion 24. An upper metal cup 30 having a middle portion 32 serving as an overflow well for mercury, an upper annular, externally threaded portion 34, and a lower portion 36, is disposed above the lower cup 20 with its portion 36 pressed through the bore 16. The portion 36 has an axial bore 38 therethrough, into which a metal capillary 40 extends as a nipple.

A rubber stopper 42 is fitted over and in the annular portion 23, and has an axial bore 44 in which a sleeve 46 is fitted, and an offset and tilted bore 48. A dielectric tube 50 has its upper end fitted over the nipple capillary 40 of the upper cup, and its lower portion fitted through the sleeve 46 into and to the bottom of the middle portion 22. A metal cap 52, having a rubber gasket 54, is threaded onto the upper annular portion 34. The cap has an upper portion 56, serving as an electric terminal, and an axial bore 57 therethrough, into which a metal capillary tube 60 is fitted. A tube 62 is fitted through the tilted bore 48 in the stopper 42 and clears through the bore 18 in the frame 12.

Thus the lower cup 20, the stopper 42, the tube 50, the upper cup 30 and the cap 52 form an air tight assembly which may be vented to the atmosphere through the tube 62 and may be coupled to the system whose pressure is to be measured through the capillary tube 60. However, the lower cup 20 is electrically isolated from the upper cup 30 and its cap 52. A quantity of mercury 51 is disposed within the well of the lower cup above the lower end of the tube 50. A partial vacuum in the upper cup will cause the mercury to rise through the dielectric tube 50 to enter the upper cup, thus electrically interconnecting the lower electrical terminal portion 24 with the upper electrical terminal portion 56.

Figure 4:
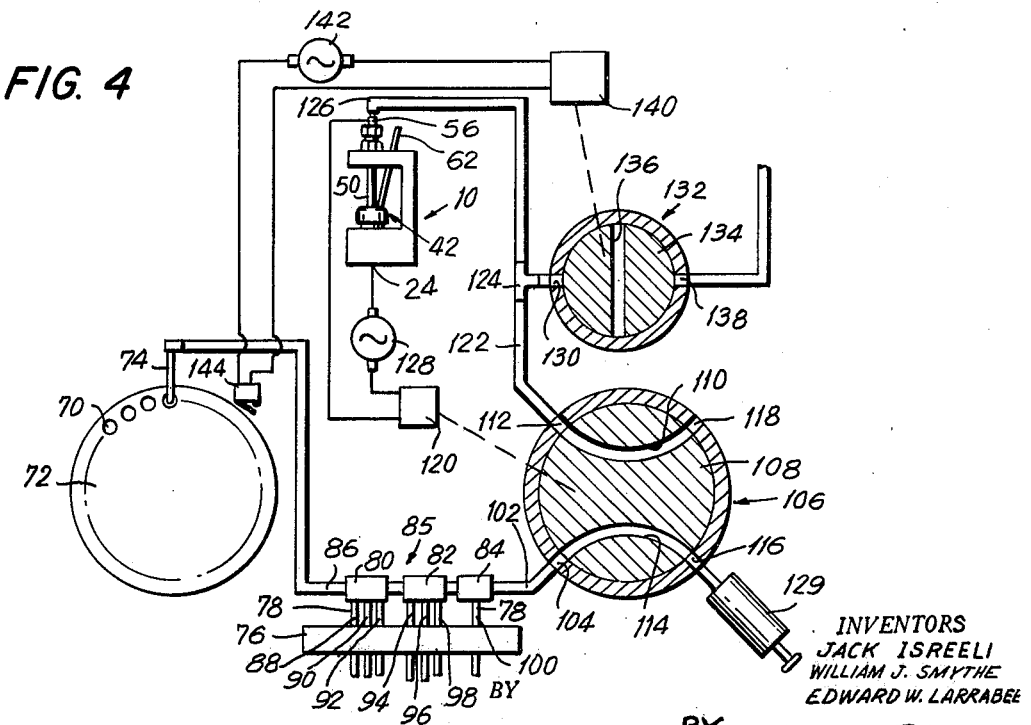
FIG. 4 is a schematic diagram of the apparatus of FIG. 3, showing the manometer-reverse flush valve in its stoppage position.

As shown in FIGS. 3 and 4, the individual sample containers 70 are carried by an intermittently rotating tray 72. The tray sequentially presents each container to an off-take station at which an off-take tube 74 is carried by a suitable support mechanism. The support mechanism inserts the end of the off-take tube into the presented container, maintains it therein for an interval of time to permit the aspiration of the sample therethrough, and removes it from the container to await the next successive container. The particular sample supply apparatus herein briefly shown is more completely described in U.S. Patent No. 3,230,776 issued to Jack Isreeli et al. on Jan. 25, 1966.

The sample is aspirated through the off-take tube 74 by a pump 76. The pump briefly shown here is of the type more completely described in U.S. Patent No. 2,935,028 issued to Andres Ferrari, Jr., et al. on May 3, 1960. The pump comprises a housing in which is disposed a motor. A pressure plate is mounted on top of the housing. Two endless chains which carry a plurality of rollers are mounted above the pressure plate and are driven by the motor. A plurality of pump tubes 78 are disposed in side by side relationship between the pressure plate and the rollers. Each roller in cyclical sequence is carried by the chains to engage, progressively occlude, and to release all of the pump tubes.

The off-take tube 74 is coupled to several of the pump tubes by a junction means, here arbitrarily shown to comprise three junction blocks 80, 82 and 84. These junction blocks are coupled in series to provide a conduit 85 having an inlet 86 and eight outlets 88, 90, 92, 94, 96, 98, 100 and 102. The outlets 88, 90, 92, 94, 96, 98 and 100 are coupled to the inlets of the respective pump tubes, by which arrangement the initial stream of sequential samples from the off-take tube is divided into seven quotient streams of sequential portions of samples. The pump tubes which are coupled to the outlets 88, 90, 92, 94, 96 and 98 pass their respective quotient streams to suitable analysis apparatus, not shown. The pump tube which is coupled to the outlet 100 passes the quotient stream to waste. The purpose of this wasted quotient stream is to isolate the quotient streams which are to be analyzed from the outlet 102.

The outlet 102 of the conduit 85 is coupled to one port 104 of a four port, two passageway, two position valve 106. The valve has a stem 108 having a passageway 110 which normally couples the port 104 to a port 112, and a passageway 114 which normally couples the port 116 to a port 118, as shown in FIG. 3. The stem 108 is coupled to a motor 120, such as a rotary solenoid, which when energized is effective to rotate the stem through a 90° swing so that the passageway 110 then intercouples the ports 112 and 118, and the passageway 114 then intercouples the ports 104 and 116, as shown in FIG. 4. The port 112 is coupled by a tube 122, a junction 124 and a tube 126 to the end of the capillary tube 60, thereby communicating the pressure within the conduit 85 to the upper cup 30. Any significant reduction in pressure within the conduit 85 below atmospheric pressure will cause the mercury within the lower cup 20 to rise upwardly in the tube 50; and at a predetermined low pressure the mercury will rise into the upper cup 30, electrically connecting the upper and lower cups. The motor 120 is in a series circuit with an electrical source 128 and the two electrical terminal portions 24 and 56. When the mercury closes the circuit on low pressure in the conduit 85, the motor is energized, rotating the valve stem to couple the port 104 to the port 116. A syringe 129 containing a back-flush liquid, such as a solution of sodium hydroxide, is coupled to the port 116, and is thereby coupled to the conduit 85. Any suitable additional alarm, such as a light or buzzer, may be connected in parallel with the motor 120, to alert the operator to the presence of a clot in the off-take system. The operator may manually operate the syringe to back-flush the conduit 85 and the off-take tube 74 to purge the clot. It will be appreciated that, if desired, an automatically operated metering pump may be substituted for the syringe, and may be operated by the manometer shortly after it has energized the motor 120.

It will be further appreciated that although the pump has continued to operate, and a relatively small portion of the back-flush liquid will be pulled into the pump tubes which are occluded by the pump tube rollers, the relatively large portion of the back-flush liquid will pass out through the off-take tube with the clot. A latching relay, not shown, having a winding in shunt with the motor 120 and normally open contacts in shunt with the manometer terminals, is advantageously provided to keep the motor and the valve stem in their energized positions until the operator has cleared the clot. The operator may thereafter open circuit the the latching relay to restore the motor and the valve stem to their normal positions.

When the motor is energized, the capillary tube 60 is coupled to the atmosphere by way of the tubes 126 and 122, the port 112, the passageway 110 and the port 118. The pressure in the upper cup will be restored to that of the atmosphere, and the mercury will drain back into the lower cup.

The junction 124 is also coupled to one port 130 of a two port valve 132, having a stem 134 with a passageway 136, and a second port 138 which is open to the atmosphere. The valve stem 134 is coupled to a motor 140, such as a rotary solenoid, which is in a series circuit with an electrical source 142 and a snap action switch 144. The motor 140 is normally unenergized, with the valve stem 134 in its closed position as shown in FIG. 3. As the sample supply apparatus rotates its tray 72 to present a new sample container to the off-take tube it operates the snap action switch for a short interval of time to energize the motor 140 to rotate the valve stem 134, to communicate the upper cup 30 to the atmosphere, thereby equalizing the air pressures in the upper cup with the air pressure in the lower cup 20 above the surface of the mercury, which is always coupled to the atmosphere through the vent tube 62.

As seen in FIGS. 5 and 6, the second embodiment of the manometer 210 comprises a frame 212 made of a dielectric, such as plastic, having a central bore with an uppermost internally threaded portion 214, an upper intermediate portion 216, a lower intermediate portion 218, a lowermost, internally threaded portion 220, a shoulder 222, and a shoulder 224. A metal screw 226, having a gasket 228 under its head 230, is screwed into the bore portion 220 with the head and gasket resting on the shoulder 224, to close the bottom of the bore of the frame. A plug 232, made of a dielectric, such as plastic, is disposed within the bore portion 218 of the frame. The plug has an annular shoulder 234 which abuts the bore shoulder 222, a central cone shaped portion 236 projecting below the shoulder 234 into the bore portion 218, a central recess 238, and a central capillary bore 240 through the length of the plug. The bore portion 218, the screw head 230, and the cone shaped portion 236 define a lower well 242 for a supply of mercury. A flat 244 is cut into the plug 232 to provide a channel for fluid flow communication between the lower well 242 and a radial bore 248 in the frame 212, whereby the well is vented to the atmosphere. This radial bore 248 may be threaded and receive a screw, not shown, to provide seal for shipping purposes. A metal cup 250 has an uppermost, externally threaded portion 252 an upper, intermediate, externally hexagonally faced portion 254, a lower, intermediate, externally threaded portion 256, and a lower, central projecting portion 258. The cup 250 also has a central bore having an enlarged upper portion 260 and a capillary lower portion 262. The threaded portion 256 of the cup 250 is threaded into the threaded portion 214 of frame bore to clamp the lower projecting portion 258 of the cup into the upper recess 238 of the plug with their respective capillary bores in sealed fluid flow communication. The enlarged upper bore portion 260 of the cup defines an overflow reservoir for the mercury. A cap 264 has a lower externally hexagonally faced portion 266, an intermediate externally threaded portion 268, and an uppermost nipple portion 270. The cap 264 has a central bore therethrough with a lower enlarged, internally threaded portion and an upper capillary portion. The cap 264 is threaded onto the cup portion 252 with a gasket 272 therebetween to seal the joint. An insulating cap 274, having an inner blind bore 276, and a lateral opening 278 may be snapped onto the cap and the cup.

The analysis apparatus of FIG. 7 is similar to that of FIG. 3 and identical elements have been given numbers with a prime superscript.

In FIGS 7 and 8, the outlet 102' of the conduit 85' is coupled to one inlet 304 of a three port, one passageway, two position valve 306. The valve has a stem 308 having a passageway 310 which normally couples the port 304 to a port 312. The stem 308 is coupled to a motor 120', such as a rotary solenoid, which when energized is effective to rotate the stem through a 90° swing so that the passageway 310 then couples the port 304 to a port 316, as shown in FIG. 8. The port 312 is coupled by a tube 122', a junction 124' and a tube 126' to the end of the capillary nipple 270, thereby communicating the pressure within the conduit 85' to the overflow reservoir 260. Any significant reduction in pressure within the conduit 85' below atmospheric pressure will cause the mercury within the lower well 242 to rise upwardly in the capillary 244; and at a predetermined low pressure the mercury will rise into the capillary 262, electrically interconnecting the lower terminal portion 226 with the upper terminal portion 268.

The junction 124' is also coupled to one port 130' of a two port valve 132', having a stem 134' with a passageway 136', and a second port 138' which is open to the atmosphere. The valve stem 134' is coupled to a motor 140', such as a rotary solenoid. The motor 120' is in series circuit with an electrical source 128' and the two electrical terminals of the manometer. The motor 140' is connected in parallel with the motor 120'. When the mercury closes the circuit, on low pressure in the conduit 85', the motors 120' and 140' are energized, rotating their respective valve stems to couple the port 304 to the port 316, and the port 130' to 138', whereby the conduit 85' is coupled to a syringe 129' and the overflow reservoir 260 is coupled through the passageway 136' to the atmosphere as shown in FIG. 8. The motor 140' is also in a series circuit with an electrical source 142' and a snap action switch 344–1–no whereby as the sampler supply apparatus rotates its tray 70' to present a new sample container to the off-take tube it operates the snap action switch for a short interval of time to energize the motor 140' to rotate the valve stem 134', to communicate the overflow reservoir to the atmosphere. The snap action switch has a normally closed throw 344–2–nc in series with the motor 120' to preclude its spurious operation between samples. It will be seen that the valve 132' is effective to vent the manometer in between each sample, and on the development of a clot; and the valve 306 is effective to couple the reverse-flush supply means or syringe 129' to the downstream end of the conduit 85' on the development of a clot.

It will be appreciated that the manometer of FIG. 1 may be used with the system of FIG. 7, and that the manometer of FIG. 5 may be used with the system of FIG. 3.

While there has been shown and described two preferred embodiments of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. Automatic analysis apparatus comprising: supply means for providing a plurality of samples sequentially as a flowing stream of successive samples; conduit means having an inlet coupled to said supply means for receiving said sample stream therefrom; pump means for drawing said sample stream along said conduit means; manometer means; and valve means for intermittently and alternatively coupling said manometer means to said conduit means for measuring the pressure in said conduit means and to the atmosphere after a selected number of samples forming a portion of said sample stream has been provided along said conduit means for balancing the pressures within said manometer.

2. Apparatus according to claim 1 further including control means responsive to said supply means for controlling said valve means to couple said manometer means to said conduit means when said supply means provides a sample along the conduit means and to couple said manometer means to the atmosphere between the provisionings by said supply means of successives samples along said conduit means.

3. Apparatus according to claim 1 wherein said manometer means comprises a lower well having a supply of mercury disposed therein; an upper well electrically isolated from said lower well, and having two ports; a first passageway extending from one of said ports of said upper well into said lower well below the normal level of said supply of mercury; said lower well having an additional port therein above the normal level of said supply of mercury providing fluid communication to the atmosphere; and a second passageway coupling said other port of said upper well to said valve means, said valve means being adapted to alternatively couple said second passageway to said conduit means or to the atmosphere whereby a change in pressure in said conduit means to below a predetermined level causes a portion of the mercury in said lower well to rise up through said first passageway into said upper well to electrically connect said wells.

4. Automatic analysis apparatus comprising: supply means for providing a liquid sample as a flowing stream; conduit means having an inlet coupled to said supply means for receiving said sample stream therefrom; pump means for drawing said sample stream along said conduit means; manometer means; reverse flush liquid supply means; valve means for alternatively coupling said conduit means to said manometer means and to said reverse flush supply means, said manometer means being adapted to provide a signal responsive to a decrease of pressure in said conduit means below a predetermined level which is indicative of a blockage in said conduit means, said reverse flush means being adapted to supply a flow of liquid through said conduit means in a direction opposite to the normal flow of said sample stream to purge said conduit means of said blockage; control means responsive to said manometer means for normally actuating said valve means to couple said manometer means to said conduit means and, upon receipt of said signal, for actuating said valve means to couple said reverse flush suply means to said conduit means, said valve means being further operative after a selected number of samples forming a portion of said sample stream have been provided along said conduit means for coupling said manometer to the atmosphere for balancing the pressures within said manometer.

5. Apparatus according to claim 4 wherein said manometer means comprises a lower well having a supply of mercury disposed therein; an upper well electrically isolated from said lower well and having two ports; a first passageway extending from one of said ports of said upper well into said lower well below the normal level of said supply of mercury; said lower well having an additional port therein above the normal level of said supply of mercury providing fluid communication to the atmosphere; and a second passageway coupling said other port of said upper well to said valve means, said valve means being adapted to alternatively couple said second passageway or said reverse flush means to (said second outlet of) said conduit means whereby a change in pressure in said conduit to below a predetermined level causes a portion of the mercury in said lower well to rise up through said first passageway into said upper well to electrically connect said wells which constitute said signal.

6. Apparatus according to claim 5 wherein said supply means provides a plurality of sequentially spaced apart samples as a flowing stream; and further including additional control means and additional valve means; said additional valve means being coupled to said second passageway of said manometer means and adapted, when actuated, to couple said second passageway to the atmosphere; said additional control means being coupled to said supply means and to said additional valve means and responsive to said supply means, between the provisionings of successive samples, for actuating said additional valve means to couple said second passageway to the atmosphere.

References Cited

Brow et al.: A Simple Micrometer, 1947, reprint from Review of Scientific Instruments, vol. 18, No. 3, pp. 183–186, March 1947.

MORRIS O. WOLK, Primary Examiner

ELLIOTT A. KATZ, Assistant Examiner

U.S. Cl. X.R.

23—230; 73—393